(12) United States Patent
Miyoshi et al.

(10) Patent No.: US 7,220,795 B2
(45) Date of Patent: May 22, 2007

(54) CONDUCTIVE RESIN COMPOSITION AND PROCESS FOR PRODUCING THE SAME

(75) Inventors: Takaaki Miyoshi, Kimitsu (JP); Kazuhiko Hashimoto, Sodegaura (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/240,793

(22) PCT Filed: Feb. 26, 2001

(86) PCT No.: PCT/JP01/01416

§ 371 (c)(1), (2), (4) Date: Oct. 4, 2002

(87) PCT Pub. No.: WO01/81473

PCT Pub. Date: Nov. 1, 2001

(65) Prior Publication Data

US 2003/0116757 A1 Jun. 26, 2003

(30) Foreign Application Priority Data

Apr. 26, 2000 (JP) ..................... 2000-125081

(51) Int. Cl.
*C08L 77/00* (2006.01)
*C08L 77/12* (2006.01)
*C08K 3/00* (2006.01)
*C08K 13/08* (2006.01)

(52) U.S. Cl. ............... 524/495; 524/424; 524/394; 524/62

(58) Field of Classification Search ............... 524/424, 524/495, 394, 62
See application file for complete search history.

(56) References Cited

U.S. PATENT DOCUMENTS

| | | | |
|---|---|---|---|
| 5,145,904 A | * | 9/1992 | Muehlbach et al. ........ 524/494 |
| 5,643,502 A | | 7/1997 | Nahass et al. |
| 5,651,922 A | * | 7/1997 | Nahass et al. .............. 252/511 |
| 5,843,340 A | * | 12/1998 | Silvi et al. ................ 252/511 |
| 5,876,647 A | | 3/1999 | Makise et al. |
| 6,149,848 A | | 11/2000 | Makise et al. |
| 6,306,976 B1 | * | 10/2001 | Matsuda et al. ............ 525/316 |
| 6,316,551 B1 | * | 11/2001 | Silvi et al. ................ 525/397 |
| 6,469,093 B1 | | 10/2002 | Koevoets et al. |
| 2003/0134963 A1 | * | 7/2003 | Miyoshi et al. ............ 524/495 |

FOREIGN PATENT DOCUMENTS

| | | |
|---|---|---|
| EP | 0506386 A2 | 9/1992 |
| EP | 0618267 A1 | 10/1994 |
| EP | 0 685 527 A1 | 12/1995 |
| EP | 0866098 A1 | 9/1998 |
| EP | 1190421 A2 | 3/2002 |
| JP | 490993555 A * | 9/1976 |
| JP | 57186959 * | 10/1982 |
| JP | 61-207465 A | 9/1986 |
| JP | 02175106 A * | 7/1990 |
| JP | 2-261861 A | 10/1990 |
| JP | 3-14867 A | 1/1991 |
| JP | 05025383 A * | 2/1993 |
| JP | 6-287446 A | 1/1994 |
| JP | 7-26081 A | 1/1995 |
| JP | 8-217972 A | 8/1996 |
| JP | 8-245876 A | 9/1996 |
| WO | WO-01/36536 A1 | 5/2001 |

\* cited by examiner

*Primary Examiner*—Kriellion A. Sanders
(74) *Attorney, Agent, or Firm*—Birch, Stewart, Kolasch & Birch, LLP (57) ABSTRACT

A resin composition comprising a polyamide, a polyphenylene ether, an impact modifier, and a carbon type filler for an electrically conductive use, the filler residing in a phase of the polyphenylene ether. The resin composition of the present invention has excellent electrical conductivity, fluidity, and an excellent balance of a coefficient of linear expansion and an impact resistance, and generation of fines caused by pelletizing thereof can be largely suppressed when processing of an extrusion thereof is conducted.

2 Claims, 1 Drawing Sheet

CONDUCTIVE RESIN COMPOSITION AND PROCESS FOR PRODUCING THE SAME

This application is the national phase under 35 U.S.C. §371 of PCT International Application No. PCT/JP01/01416 which has an International filing date of Feb. 26, 2001, which designated the United States of America.

TECHNICAL FIELD

The present invention relates to a resin composition which has excellent electrical conductivity, fluidity, and an excellent balance of a coefficient of linear expansion and an impact resistance, and wherein generation of fines caused by pelletizing is largely suppressed when processing of extrusion thereof is conducted, and to a method for producing thereof.

The composition of the present invention can be used in broad fields such as electrical or electronic parts, OA parts, parts of vehicles, mechanical parts, etc., and among them, it can be suitably used in exterior automobile parts wherein electrostatic coating is possible.

BACKGROUND ART

A polyphenylene ether resin has an excellent mechanical property, electrical property, and thermal resistance, and has an excellent dimensional stability, and therefore it is used in a broad range. However, a processing property of molding thereof by itself is inferior. In order to improve the processing property, the technique of formulating a polyamide therewith is proposed in JP-B-45-997. And even thereafter, various improvements have been added thereto, and at present, it has become a material which has many varied uses.

Having heightened consciousness to environment of recent years as a background, to improve fuel cost of automobiles, study of utilizing a resin as exterior automobile materials has been conducted.

Especially, in Europe, a need has arisen for materials which can be electrostatically coated using the same coating line as that used for a steel plate and thus providing materials with electrical conductivity.

As a conventional prior art concerning exterior automobile materials, it is described, for instance, in JP-A-2-163158, JP-A-4-372656, and JP-A-6-306275, that high balance of a coefficient of linear expansion and an impact resistance is important, and a composition comprising a polyamide resin, a polyphenylene ether, and an inorganic filler is useful.

However, in the above-described conventional prior art, since the coefficient of linear expansion is decreased by adding the inorganic filler, sufficient level of an impact resistance was not attained, and it has not been afforded to a practical use, which has been the actual status.

From the above-described standpoint, the technique wherein improvement in balance of a coefficient of linear expansion and an impact resistance can be attained by using a composition substantially not containing an inorganic filler is required.

JP-A-6-287446 discloses a composition comprising a polyamide, a polyphenylene ether, a styrene type resin and a pigment, wherein yellowing of the composition is reduced by dispersing the pigment in a phase of the polyphenylene ether and the styrene type resin.

However, since the composition obtained by the technique as described in JP-A-6-287446 contains a large amount of a styrene type resin, a coefficient of linear expansion thereof becomes high and an impact resistance thereof is also largely decreased. Also it has not in the least electrical conductivity necessary for electrostatic coating, and therefore it can not be used for exterior automobile parts wherein electrostatic coating is possible.

To provide a polymer alloy of a polyphenylene ether and a polyamide with electrical conductivity, JP-A-2-201811 discloses a technique of making a carbon black present mainly in a phase of the polyamide in a mixture of a polyphenylene ether, a polyamide, and a carbon black.

However, as in the technique as disclosed in JP-A-2-201811, when a large amount of carbon black is formulated in a phase of a polyamide, the polyamide becomes extremely fragile and highly viscous, and therefore an impact resistance and fluidity as a composition are greatly worsened. Also, a coefficient of linear expansion thereof is greatly worsened. This is thought to be because an orientation and a crystallization of the polyamide has been inhibited under the influence of an isotropic filler having electrical conductivity.

Further, in the above-stated conventional prior art, a large amount of swarf which is called as "fines caused by pelletizing" (hereinafter sometimes referred to as "fines") is generated in a pelletizing step (a step wherein a strand extruded from an extruder is cut to form pellets) on processing. Usually, it is difficult to remove these fines completely.

These fines caused by pelletizing, in a place of fabrication, attach to a pellet drier, a pneumatic transportation lines of a molding machine, a hopper part of a molding machine, etc., which necessitates cleaning upon a change of resin type causing greatly decreased productivity. Therefore, this matter as well as the performance of the above arts has been an item always demanded to be improved.

As above, in the conventional prior art, a material which has excellent electrical conductivity, fluidity, and an excellent balance of a coefficient of linear expansion and an impact resistance, and wherein generation of fines caused by pelletizing is greatly suppressed, has not heretofore been available.

Moreover, exterior automobile materials have many necessary properties in addition to the above-described characteristic properties, and for instance, JP-A-60-65035 describes that high adhesion properties with a coating are also required.

The present invention aims to solve the problems which have not been solved by the above stated prior art.

It is therefore an object of the present invention to provide a resin composition which has excellent electrical conductivity, fluidity, and an excellent balance of a coefficient of linear expansion and an impact resistance, and wherein generation of fines caused by pelletizing is largely suppressed.

DISCLOSURE OF THE INVENTION

The present inventors have intensively studied to solve the problem as described above, and as a result, surprisingly, they have found that, by making a carbon type filler for an electrically conductive use reside in a phase of a polyphenylene ether, a resin composition which has excellent electrical conductivity, fluidity, and an excellent balance of a coefficient of linear expansion and an impact resistance, and wherein generation of fines caused by pelletizing is largely suppressed, can be obtained. Thus, the present invention has been accomplished.

The resin composition of the present invention comprises a polyamide, a polyphenylene ether, an impact modifier, and a carbon type filler for an electrically conductive use, the carbon type filler residing in a phase of the polyphenylene ether.

The present invention also relates to a process for producing the above-described resin composition, wherein the carbon type filler for an electrically conductive use is preliminarily melted and kneaded with an impact modifier.

BEST MODE TO CARRY OUT THE INVENTION

Hereinafter, the present invention is explained in detail.

A type of a polyamide which can be used in the present invention is any one which has an amido bond {—NH—C(=O)—} in the main chain of the polymer.

Generally, a polyamide can be obtained by a ring opening polymerization of lactams, a condensation polymerization of a diamine and a dicarboxylic acid, and a condensation polymerization of an aminocarboxylic acid, etc., but is not limited thereto.

As the above-described diamine, an aliphatic, an alicyclic, and an aromatic diamine are exemplified, and specifically, tetramethylene diamine, hexamethylene diamine, undecamethylene diamine, dodecamethylene diamine, tridecamethylene diamine, 2,2,4-trimethylhexamethylene diamine, 2,4,4-trimethylhexamethylene diamine, 5-methylnanomethylene diamine, 1,3-bisaminomethyl cyclohexane, 1,4-bisaminomethyl cyclohexane, m-phenylene diamine, p-phenylene diamine, m-xylylene diamine, and p-xylylene diamine, are mentioned.

As the dicarboxylic acid, an aliphatic, an alicyclic, and an aromatic dicarboxylic acid are exemplified, and specifically, adipic acid, suberic acid, azelaic acid, sebacic acid, dodecanoic diacid, 1,1,3-tridecanoic diacid, 1,3-cyclohexane dicarboxylic acid, terephthalic acid, isophthalic acid, naphthalene dicarboxylic acid, dimmer acid, etc., are mentioned.

As the lactams, specifically, ε-caprolactam, enanthlactam, ω-laurocaprolactam, etc., are mentioned.

Further, as the aminocarboxylic acid, specifically, ε-aminocaproic acid, 7-aminoheptanoic acid, 8-aminooctanoic acid, 9-aminononanoic acid, 11-aminoundecanoic acid, 12-aminododecanoic acid, 13-aminotridecanoic acid, etc., are mentioned.

In the present invention, any of copolymer polyamides can be used, which is obtained by conducting a condensation polymerization singly of or in a mixture of at least two sorts of the above lactams, diamines, dicarboxylic acids and aminocarboxylic acids.

Moreover, polyamides obtained by polymerizing the above lactams, diamines, dicarboxylic acids and aminocarboxylic acids in a reactor for the polymerization to a stage of an oligomer having a low molecular weight, and further polymerizing to a stage thereof having a high molecular weight with such as an extruder, can suitably be used.

As a polyamide especially usefully employed in the present invention, a polyamide 6, a polyamide 6,6, a polyamide 4,6, a polyamide 11, a polyamide 12, a polyamide 6,10, a polyamide 6,12, a polyamide 6/6,6, a polyamide 6/6,12, a polyamide MXD,6 (MXD: m-xylylene diamine), a polyamide 6/MXD,6, a polyamide 6,6/MXD, 6, a polyamide 6,T, a polyamide 6,I, a polyamide 6/6,T, a polyamide 6/6,I, a polyamide 6,6/6,T, a polyamide 6,6/6,I, a polyamide 6/6,T/6,I, a polyamide 6,6/6,T/6,I, a polyamide 6/12/6,T, a polyamide 6,6/12/6,T, a polyamide 6/12/6,I, a polyamide 6,6/12/6,I, etc., are exemplified, and polyamides obtained by copolymerizing plural of polyamides with an extruder or the like can also be usable.

These may surely be used in a combination of at least two sorts thereof.

A preferable number average molecular weight of a polyamide used in the present invention is 5,000 to 100,000, preferably 7,000 to 30,000, more preferably 9,000 to 15,000.

The polyamide in the present invention may be a mixture of several polyamides having different molecular weights. For instance, a mixture of a low molecular weight polyamide having a number average molecular weight of not higher than 10,000, and a high molecular weight polyamide having a molecular weight of not lower than 30,000, and a mixture of a low molecular weight polyamide having a number average molecular weight of not higher than 10,000, and a general polyamide having a molecular weight to the extent of 15,000, are exemplified, but are not limited thereto.

These may surely be used in a mixture of different kinds of polyamides which have different molecular weights.

A terminal group of a polyamide has an effect on a reaction with a polyphenylene ether. A polyamide has generally an amino group and a carboxyl group as terminal groups thereof. Generally, in an alloy of a polyamide and a polyphenylene ether type, when the concentration of a carboxyl group is higher than the concentration of an amino group, an impact resistance thereof is decreased and fluidity thereof is improved, whereas when the concentration of an amino group is higher than the concentration of a carboxyl group, an impact resistance thereof is improved and fluidity thereof is decreased, A preferable ratio of amino groups/carboxyl groups is 9/1 to 1/9, more preferably 8/2 to 1/9, further preferably 6/4 to 1/9.

The concentration of terminal amino groups is preferably at least 10 milliequivalent/kg, more preferably at least 30 milliequivalent/kg.

As a method for adjusting a terminal group of these polyamides, a method known to a person skilled in the art may be used. For instance, addition of diamines and dicarboxylic acids, and addition of a monocarboxylic acid, on polymerization of a polyamide, are mentioned.

The polyamide in the present invention may surely be a mixture of plural polyamides having different concentrations of a terminal group thereof.

Further, known additives which may be added to a polyamide, may be present in concentrations of less than 10 parts by weight based on 100 parts by weight of a polyamide.

The polyphenylene ether which can be used in the present invention is a homopolymer or a copolymer or both composed of the structural unit represented by the formula as shown below, wherein $R_1$ and $R_4$ independently represent hydrogen, halogen, primary or secondary lower alkyl, phenyl, haloalkyl, aminoalkyl, hydrocarbonoxy, or halohydrocarbonoxy, with a proviso that at least two carbon atoms are between a halogen atom and an oxygen atom, and $R_2$ and $R_3$ independently represent hydrogen, halogen, primary or secondary lower alkyl, phenyl, haloalkyl, hydrocarbonoxy, or halohydrocarbonoxy, with a proviso that at least two carbon atoms separate a halogen atom and an oxygen atom.

As a specific example of the polyphenylene ether according to the present invention, for instance, poly(2,6-dimethyl-1,4-phenylene ether), poly(2-methyl-6-ethyl-1,4-phenylene ether), poly(2-methyl-6-phenyl-1,4-phenylene ether), poly(2,6-dichloro-1,4-phenylene ether), etc., are exemplified, and further a copolymer of a polyphenylene ether such as a copolymer of 2,6-dimethylphenol with other phenols (for example, 2,3,6-trimethylphenol, and 2-methyl-6-butylphenol), is exemplified. Among these, poly(2,6-dimethyl-1,4-phenylene ether), and a copolymer of 2,6-dimethylphenol with 2,3,6-trimethylphenol are preferred, and poly(2,6-dimethyl-1,4-phenylene ether) is most preferred.

Any known method can be employed for producing polyphenylene ethers useful in the present invention. One such example is described in U.S. Pat. No. 3,306,874, wherein suitable polyethylene ethers are easily produced by employing a complex of copper (I) chloride and an amine as a catalyst, and conducting an oxidative polymerization of, for example, 2,6-dimethylphenol. Besides this, polyphenylene ethers can be easily produced by methods as described in U.S. Pat. Nos. 3,306,875, 3,257,357, and 3,257,358; and JP-B-52-17880, JP-A-50-51197, JP-A-63-152628, etc.

A reduced viscosity of a polyphenylene ether as can be used in the present invention (0.5 g/dl, in a solution of chloroform, measured at 30° C.) is preferably in the range of 0.15 to 0.70 dl/g, more preferably in the range of 0.20 to 0.60 dl/g, most preferably in the range of 0.40 to 0.55 dl/g.

Even a blend of at least two sorts of polyphenylene ethers having different reduced viscosities can be used without any problem. For instance, a mixture of a polyphenylene ether having a reduced viscosity of not higher than 0.45 dl/g and a polyphenylene ether having a reduced viscosity of not lower than 0.50 dl/g, a mixture of a low molecular weight polyphenylene ether having a reduced viscosity of not higher than 0.40 dl/g and a polyphenylene ether having a reduced viscosity of not lower than 0.50 dl/g, etc., are exemplified, but of course, it is not limited thereto.

Concerning a polyphenylene ether used in the present invention, an organic solvent, from the polymerization, may reside therein in an amount of less than 5% by weight based on 100 parts by weight of a polyphenylene ether. It is difficult to completely remove the organic solvent owing to a solvent for a polymerization at a drying step after polymerization, and it usually remains present in the range of several hundreds ppm to several %. As the organic solvent from the polymerization as stated herein, at least one of each of isomers of toluene, and xylene, ethylbenzene, alcohols having a carbon number of 1 to 5, chloroform, dichloromethane, chlorobenzene, dichlorobenzene, etc., are exemplified.

Further, a polyphenylene ether which can be used in the present invention may be a wholly or a partly modified polyphenylene ether.

The modified polyphenylene ether referred to herein means a polyphenylene ether which has been modified with at least one sort of a modifying compound which has in the molecular structure thereof at least one C—C double bond or triple bond, and has at least one of a carboxylic acid group, an acid anhydride group, an amino group, a hydroxyl group, or a glycidyl group.

As a method for producing the modified polyphenylene ether, (1) a method for reacting a polyphenylene ether with a modifying compound in a presence or absence of a radical initiator, in the range of a temperature of not lower than 100° C. and lower than the glass transition temperature of the polyphenylene ether, and without melting the polyphenylene ether, (2) a method for reacting it with a modifying compound by melting and kneading in the presence or absence of a radical initiator, and in the range of a temperature of not lower than the glass transition temperature of a polyphenylene ether and not higher than 360° C., (3) a method for reacting in a solution a polyphenylene ether with a modifying compound in the presence or absence of a radical initiator, at a temperature of lower than a glass transition temperature of the polyphenylene ether, etc., are exemplified. Any of these methods may be usable, but methods (1) and (2) are preferable.

Next, at least one sort of a modifying compound which has, in the molecular structure thereof, at least one C—C double bond or triple bond, and at least one of: a carboxylic acid group, an acid anhydride group, an amino group, a hydroxyl group, or a glycidyl group, is specifically explained.

As a modifying compound which has in the molecule thereof at least one C—C double bond, and a carboxylic acid group or an acid anhydride group at the same time, a maleic acid, a fumaric acid, a chloromaleic acid, cis-4-cyclohexene-1,2-dicarboxylic acid, an acid anhydride thereof, etc., are exemplified. Especially, a fumaric acid, a maleic acid, and a maleic anhydride are preferred, and a fumaric acid, and a maleic anhydride are particularly preferred.

Further, those wherein at least one or two carboxyl groups among carboxyl groups of these unsaturated dicarboxylic acids, have become an ester, can also be used.

As a modifying compound which has in the molecule thereof at least one C—C double bond and a glycidyl group at the same time, allylglycidyl ether, glycidyl acrylate, glycidyl methacrylate, an epoxidized natural oil and fat, etc., are exemplified. Among these, glycidyl acrylate and glycidyl methacrylate are especially preferred.

As a modifying compound which has in the molecule thereof at least one C—C double bond and a hydroxyl group at the same time, an unsaturated alcohol having a general formula $C_nH_{2n-3}OH$ (n is a positive integer), and an unsaturated alcohol having a general formula $C_nH_{2n-5}OH$, or $C_nH_{2n-7}OH$ (n is a positive integer), etc., such as allyl alcohol, 4-pentene-1-ol, 1,4-pentadiene-3-ol, etc., are exemplified.

The above-described modifying compound may be used singly or in a combination.

An amount of the modifying compound to be added on producing a modified polyphenylene ether is preferably 0.1 to 10 parts by weight, more preferably 0.3 to 5 parts by weight, based on 100 parts by weight of a polyphenylene ether.

A preferable amount of a radical initiator on producing a modified polyphenylene ether by using the radical initiator is preferably 0.001 to 1 parts by weight, based on 100 parts by weight of a polyphenylene ether.

A ratio of the modifying compound added among a modified polyphenylene ether is preferably 0.01 to 5% by weight, more preferably 0.1 to 3% by weight.

In the modified polyphenylene ether, an unreacted modifying compound and/or a polymer of the modifying compound may reside. An amount of the unreacted modifying compound and/or the polymer of the modifying compound which reside in a modified polyphenylene ether is preferably less than 1% by weight, particularly preferably 0.5% by weight.

Furthermore, to reduce the amount of the unreacted modifying compound and/or the polymer of the modifying compound which reside in a modified polyphenylene ether, on producing the modified polyphenylene ether, if necessary, a compound having an amido bond and/or an amino group may be used.

The compound having an amido bond as herein said, means a compound having a structure of an amido bond {—NH—C(=O)—} in the molecular structure thereof, and a compound having an amino group means a compound having a structure of {—NH$_2$} at at least one the terminal end thereof. As a specific example of these compounds, aliphatic amines such as octyl amine, nonyl amine, tetramethylene diamine, hexamethylene diamine, etc., aromatic amines such as aniline, m-phenylenediamine, p-phenylenediamine, m-xylylenediamine, p-xylylenediamine, etc., a product obtainable by reacting the above-described amines with a carboxylic acid or a dicarboxylic acid, etc., lactams such as ε-caprolactam, etc., and a polyamide resin, etc., are exemplified, but it is not limited thereto.

A preferable amount of these compounds having an amido bond or an amino group is 0.001 to 5 parts by weight, preferably 0.01 to 1 parts by weight, more preferably 0.01 to 0.1 parts by weight, based on 100 parts by weight of a polyphenylene ether.

Moreover, in the present invention, a styrene type thermoplastic resin may be contained in an amount of less than 5 parts by weight based on 100 parts by weight of the total amount of the polyamide and the polyphenylene ether.

The styrene type thermoplastic resin as referred to in the present invention, includes a homopolystyrene, a rubber-modified polystyrene (HIPS), a styrene-acrylonitrile copolymer (AS resin), a styrene-rubber-like copolymer-acrylonitrile copolymer (ABS resin).

When these styrene type thermoplastic resins are formulated in an amount of not less than 5 parts by weight based on 100 parts by weight of the total amount of a polyamide and a polyphenylene ether, electrical conductivity, and a balance of a coefficient of linear expansion and an impact resistance become worsened, and the amount of fines caused by pelletizing, which are generated while processing an extrusion, becomes very large.

Further, the additives which are permitted to be added to a polyphenylene ether, may be added in an amount of less than 10 parts by weight based on 100 parts by weight of a polyphenylene ether.

An impact modifier which can be used in the present invention is a natural or synthetic copolymer material which is an elastomer at a room temperature (23° C.).

As a specific example thereof, a natural rubber, a polymer of a conjugated diene compound, a copolymer of an aromatic vinyl compound and a conjugated diene compound, a hydrogenated product of a copolymer of an aromatic vinyl compound and a conjugated diene compound, a polyolefin, a polyester elastomer, a poly-urethane elastomer, a polyamide elastomer, an acrylic ester core-shell copolymer, etc., are mentioned.

Among these, a copolymer of an aromatic vinyl compound and a conjugated diene compound, a hydrogenated product of a copolymer of an aromatic vinyl compound and a conjugated diene compound, and a polyolefin, are preferred, and a block copolymer of an aromatic vinyl compound and a conjugated diene compound, a hydrogenated product of a block copolymer of an aromatic vinyl compound and a conjugated diene compound, and an ethylene-α-olefin copolymer are most preferred.

The block copolymer of an aromatic vinyl compound and a conjugated diene compound as herein called is a block copolymer composed of a polymer block segment (A) mainly consisting of an aromatic vinyl compound and a polymer block segment (B) mainly consisting of a conjugated diene compound, and the linking structure of each blocks is preferably at least one selected from the group consisting of an AB type, an ABA type, and an ABAB type, and more preferably at least one selected from the group consisting of an ABA type, and an ABAB type. Furthermore, an ABAB type is most preferred since a balance of a coefficient of linear expansion and an impact resistance is excellent.

The weight ratio of an aromatic vinyl compound and a conjugated diene compound in the block copolymer is preferably from 10/90 to 90/10, more preferably from 15/85 to 55/45, most preferably from 20/80 to 45/55.

Further, these may be a blend of at least two sorts having different weight ratios of aromatic vinyl compound to conjugated diene compound.

As a specific example of an aromatic vinyl compound, styrene, α-methyl styrene, vinyl toluene, etc., are mentioned, and at least one compound selected from these is used. Among these, styrene is particularly preferred.

As a specific example of a conjugated diene compound, butadiene, isoprene, piperylene, 1,3-pentadiene, etc., are mentioned, and at least one compound selected from these is used. Among these, butadiene, isoprene, and a combination thereof is preferred.

When butadiene is employed as a conjugated diene compound in the block copolymer, concerning a micro-structure of a portion of polybutadiene block, a 1,2-vinyl content or the total content of a 1,2-vinyl content and a 3,4-vinyl content, is preferably from 5 to 80%, more preferably from 10 to 50%, most preferably from 15 to 40%.

The hydrogenated product of a block copolymer of an aromatic vinyl compound and a conjugated diene compound means what has been obtained by conducting a hydrogenation treatment of the above-stated block copolymer of an aromatic vinyl compound and a conjugated diene compound and by controlling an aliphatic double bond of a polymer block segment mainly consisting of a conjugated diene compound in a range of over 0 to 100%. A hydrogenated ratio of a hydrogenated product of the block copolymer is preferably at least 50%, more preferably at least 80%, most preferably at least 98%.

The molecular weight of the block copolymer of an aromatic vinyl compound and a conjugated diene compound, and a hydrogenated product thereof useful in the present invention, is preferably from 10,000 to 500,000, most preferably from 40,000 to 250,000, in terms of a number average molecular weight (Mn) as measured at 40° C. with a GPC device [SYSTEM 21] manufactured by Showa Denko Co., using chloroform as a solvent and a polystyrene as a standard thereof.

Concerning the block copolymer of an aromatic vinyl compound and a conjugated diene compound, at least two sorts thereof having different linking styles, having different molecular weights, having different sorts of an aromatic vinyl compound, having different sorts of a conjugated diene compound, having different 1,2-vinyl contents or 1,2-vinyl contents and 3,4-vinyl contents, having different contents of an aromatic vinyl compound component, or having different hydrogenated ratios, etc., may be used in a mixture.

An ethylene-α-olefin copolymer which can be used in the present invention is a copolymer of ethylene with at least one sort of α-olefine having a carbon number of 3 to 20, more preferably a copolymer with at least one sort of α-olefine having a carbon number of 3 to 16, most preferably a copolymer with at least one sort of α-olefine having a carbon number of 3 to 12.

As an α-olefine copolymerizable with an ethylene unit, propylene, butene-1, pentene-1, 4-methylpentene-1, hexene-1, heptene-1, octene-1, nonene-1, decene-1, undecene-1, dodecene-1, tridecene-1, tetradecene-1, pentadecene-1, hexadecene-1, heptadecene-1, octadecene-1, nonadecene-1, or eicosene-1, isobutylene, etc., can be exemplified.

A preferable content of ethylene in the ethylene-α-olefin copolymer in the present invention is 30 to 95% by weight based on the total amount of ethylene-α-olefin copolymer.

Further, the ethylene-α-olefin copolymer in the present invention is more preferred to be an ethylene-α-olefin copolymer produced by using a single site catalyst. The ethylene-α-olefin copolymer produced by using a single site catalyst, is commercially available, and is already known. For instance, it is described in JP-B-4-12283, JP-A-60-35006, JP-A-60-35007, JP-A-60-35008, JP-A-5-155930, JP-A-3-163088, and U.S. Pat. No. 5,272,236.

The single site catalyst is a metallocene catalyst containing 1 to 3 molecules of cyclopentadienyl or a substituted cyclopentadienyl or a catalyst geometrically controlled of which a property of an active point is uniform.

A polymerization method of the ethylene-α-olefin copolymer in the present invention can be conducted by a gas phase method or a solution method as shown in the above-described publications. A preferable polymerization method is a solution method.

The molecular weight of the ethylene-α-olefin copolymer in the present invention, is preferably not lower than 10,000, more preferably from 10,000 to 100,000, most preferably from 20,000 to 60,000, in terms of a number average molecular weight (Mn) as measured at 140° C. with a device: 150c-GPC manufactured by WATERS Co., using 1,2,4-trichlorobenzene as a solvent and a polystyrene as a standard thereof.

The molecular weight distribution (weight average molecular weight/number average molecular weight: Mw/Mn) of the ethylene-α-olefin copolymer in the present invention, as measured by the above stated GPC, is preferably not higher than 3, and is more preferably from 1.8 to 2.7.

An impact modifier which can be used in the present invention, may be a wholly or a partly modified impact modifier.

The modified impact modifier referred to herein means an impact modifier which has been modified with at least one sort of a modifying compound which has in the molecular structure thereof at least one C—C double bond or triple bond, and has at least one of a carboxyl acid group, an acid anhydride group, an amino group, a hydroxyl group, or a glycidyl group.

As a method for producing the modified impact modifier,
(1) a method for reacting it with the modifying compound by melting and kneading in the presence or absence of a radical initiator, and in the range of temperature of not lower than a softening temperature of the impact modifier and not higher than 250° C.,
(2) a method for reacting in a solution an impact modifier with the modifying compound in a presence or absence of a radical initiator, at a temperature of not higher than the softening temperature of the impact modifier,
(3) a method for reacting an impact modifier with the modifying compound in a presence or absence of a radical initiator, at a temperature of not higher than the softening temperature of the impact modifier, and without melting the impact modifier and the modifying compound, etc., are exemplified.

Any of these methods may be usable, but the method of (1) is preferable, and further in the method of (1), conducted in the presence of a radical initiator, is most preferable.

The at least one sort of a modifying compound which has, in the molecular structure thereof, at least one C—C double bond or triple bond, and has at least one of a carboxyl acid group, an acid anhydride group, an amino group, a hydroxyl group, or a glycidyl group, as herein so called, means the same as the modifying compound mentioned concerning the modified polyphenylene ether.

Further, as the impact modifier of the present invention, what has preliminarily been mixed with an oil having a paraffin as a main component thereof, may be used. By preliminarily mixing with an oil having a paraffin as a main component thereof, a balance of a coefficient of linear expansion and an impact resistance, can further be very usefully improved.

The preferable amount of oil is not more than 70 parts by weight, based on 100 parts by weight of the impact modifier. When more than 70 parts by weight is present, the handling property thereof is inferior.

The oil having a paraffin as a main component thereof, referred to herein, means a mixture of a hydrocarbon type compound comprised of three combined components of a compound containing an aromatic ring, a compound containing a naphthenic ring, and a paraffin type compound, and having a weight average molecular weight of a range of 500 to 10000, which has a content of the paraffin type compound of not lower than 50% by weight.

More preferably, it is comprised of 50 to 90% by weight of a paraffin type compound, 10 to 40% by weight of a compound containing a naphthenic ring, and not more than 5% by weight of a compound containing an aromatic ring.

The oil having a paraffin as a main component thereof is commercially available, such as for example, PW 380, manufactured by Idemitsu Kosan Co., Ltd., is mentioned.

Non-limiting examples of a method of mixing the above-described oil with an aromatic impact modifier include: a method wherein a predetermined amount of a paraffin type oil is added to the impact modifier having a shape of pellet or powder to become uniform, and is left to stand; and a method wherein a predetermined amount of a paraffin type oil is added on the way of an extruder, and is melted and kneaded.

A carbon type filler for an electrically conductive use, which can be used in the present invention, is a carbon type filler which is used for the purpose to provide a non-electrically conductive material with an electrically conductive property, whose shape may be, that of a particle, a flake, or a fiber.

As an example thereof, a carbon black, a nanotube carbon, a carbon fiber, and graphite, for an electrically conductive use can be used, and among these, a carbon black for an electrically conductive use is most suitable.

A carbon black for an electrically conductive use, which can be used in the present invention, is a carbon black having an amount of absorbing dibutyl phthalate (DBP) of not less than 250 ml/100 g, preferably having an amount of absorbing dibutyl phthalate (DBP) of not less than 300 ml/100 g, more preferably having an amount of absorbing dibutyl phthalate (DBP) of not less than 350 ml/100 g. The amount of absorbed DBP as stated herein, means a value as measured by the method as determined by ASTM D 2414.

Further, as a carbon black for an electrically conductive use, according to the present invention, a carbon black having a BET surface area of not smaller than 200 m²/g, is preferred, and that having a BET surface area of not smaller than 400 m²/g is more preferred.

As a carbon black for an electrically conductive use which is commercially available, a Ketjen black EC-600JD [an amount of absorbing DBP=495 ml/100 g, and a BET surface area=1270 m²/g] and a Ketjen black EC [an amount of absorbing DBP=360 ml/100 g, and a BET surface area=800 m²/g] manufactured by Ketjen Black International Co., are exemplified.

A carbon black for an electrically conductive use of the present invention, does not include a carbon black for a general coloring use. The carbon black for a coloring use is that having the above stated amount of absurbed DBP of less than 250 ml/100 g, and a BET surface area of less than 200 m²/g.

In the present invention, when a carbon black for coloring use is employed instead of a carbon black for an electrically conductive use, which is made to reside in a phase of a polyphenylene ether, electrical conductivity, and the balance of coefficient of linear expansion and impact resistance all become worse. Furthermore, the amount of fines caused by pelletizing, which are generated while processing an extrusion, increases.

A nanotube carbon which can be used in the present invention means a hollow carbon type fiber having a diameter not larger than 1 µm, which also includes that having a shape of a coil wherein a spiral has a pitch of not greater than 1 µm.

A carbon fiber which can be used in the present invention includes all fibers which are obtained by calcinating and carbonizing in an inert atmosphere at a temperature of 1000° C. to 3500° C. a fiber wherein a polyacrylonitrile (PAN), a pitch, etc. were used as a raw material. A preferable diameter of the fiber is 3 to 30 µm, 5 to 20 µm is more preferred.

A graphite which can be used in the present invention includes not only what is obtained by heating anthracite, or pitch, etc. at a high temperature in an arc furnace, but also a graphite which is naturally produced. Graphite particles preferably have an average diameter of 0.1 to 50 µm, more preferably 1 to 30 µm.

These carbon type fillers for an electrically conductive use, may surely be improved with respect to their adhesion property with a resin or with respect to their handling property by using various known kinds of coupling agents and/or sizing agents.

In the present invention, an amount of the carbon type filler for an electrically conductive use, is preferred to be in the range of 0.5 to 50 parts by weight based on 100 parts by weight of a mixture mainly composed of 40 to 90 parts by weight of a polyamide, 5 to 50 parts by weight of a polyphenylene ether, and 5 to 30 parts by weight of an impact modifier.

In the present invention, a metallic salt as represented by the following formula, may be used.

wherein $M^{y+}$ represents at least one metallic ion selected from the group consisting of copper, nickel, tin, cerium and an alkaline metal, and $X^{z-}$ represents a negatively charged ion of a halide ion such as Cl, Br, F, I, etc., or a carboxylate ion, such as a stearate, an acetate, etc., n is an integer of 1 to 6, y is an integer indicating electric charge of a positive ion of M, and z is an integer indicating electric charge of a negative ion of X.

By formulating the above-described metallic salt to the composition of the present invention, an adhesion property with a coat after coating can be made to be strong.

Preferable as $M^{y+}$ in the formula are copper and/or an alkaline metal ion, and an alkaline metal ion is most preferable. Most preferable as $X^{z-}$ is a halogen ion, especially an iodine ion and/or a bromine ion are preferable. An iodine ion is most preferable.

As a specific example of the metallic salt which can be used in the present invention, copper iodide, copper chloride, copper acetate, potassium iodide, cerium stearate, etc. are mentioned. Among these, copper iodide, potassium iodide, copper bromide, potassium bromide, and sodium iodide, are more preferable. Potassium iodide and sodium iodide, are most preferable. They may be used in combination.

A formulated amount of the metallic salt, is preferably an amount of less than 2 parts by weight based on 100 parts by weight of the total amount of a polyamide, a polyphenylene ether, an impact modifier, and a carbon type filler for an electrically conductive use, preferably of 0.001 to 1 parts by weight, more preferably of 0.001 to 0.5 parts by weight.

As a method of adding this metallic salt, (1) a method of adding a metallic salt on a polymerization of a polyamide to be used, (2) a method of adding in a form of a master batch wherein a metallic salt has been preliminarily mixed with the whole or a part of a polyamide (preliminarily formulated with a polyamide in a high concentration), (3) a method of directly adding a metallic salt when a composition is produced, etc., are exemplified. Any of the methods may be usable, but the methods of (1) or (2) is preferable. A combination of these methods also is surely possible.

Further, in the present invention, a compatibilizer may be used when the composition is produced.

A main purpose of using the compatibilizer is to improve a physical property of a polyamide-polyphenylene ether mixture. The compatibilizer which can be used in the present invention means a multifunctional compound which interacts with a polyphenylene ether, a polyamide, or both of them. The interaction may be chemical (for example, grafting), or physical (for example, a change of a surface property of a dispersion phase). In any case the resultant polyamide-polyphenylene ether mixture exhibits an improved compatibility.

Examples of various kinds of a compatibilizer which can be used when the present invention is conducted, as is explained below include: a liquid diene polymer, a polymer containing a functional group, an epoxy compound, a polyolefin oxide wax, quinones, an organosilane compound, and a multifunctional compound.

Examples of a liquid diene polymer which can be suitably used in the present invention include: a homopolymer of a conjugated diene, and a copolymer of a conjugated diene with at least one monomer selected from the group consisting of another conjugated diene, a vinyl monomer (for example, styrene and α-methylstyrene), an olefin (for example, ethylene, propylene, butene-1, isobutylene, hexene-1, octene-1, and dodecene-1), and a mixture of these. The number average molecular weight thereof is from 150 to 10,000, preferably from 150 to 5,000. These homopolymers and copolymers can be produced, for instance, by the methods as described in U.S. Pat. Nos. 4,054,612, 3,876,721, and 3,428,699. Among these polymers, particularly a polybutadiene, a polyisoprene, a poly(1,3-pentadiene), a poly(butadiene-isoprene), a poly(styrene-butadiene), a polychloroprene, a poly(butadiene-α-methylstyrene), a poly(butadiene-styrene-isoprene), a poly(butylene-butadiene), etc., are exemplified.

As a polymer containing a functional group, which can be suitably used in the present invention, a copolymer of an aromatic vinyl compound with a vinyl compound containing at least one sort of a functional group which has in the molecular structure thereof at least one C—C double bond or triple bond, and at least one of a carboxylic acid group, an acid anhydride group, an amino group, a hydroxyl group, or a glycidyl group, is exemplified. The vinyl compound containing at least one sort of a functional group which has in the molecular structure thereof at least one C—C double bond or triple bond, and at least one of a carboxylic acid group, an acid anhydride group, an amino group, a hydroxyl group, or a glycidyl group, is the same as the one which can be used as a modifying compound of a polyphenylene ether, and at least one selected from these can be used. Among these, maleic anhydride, glycidyl acrylate and glycidyl methacrylate are preferred. As an example of an aromatic vinyl compound, styrene, α-methylstyrene, vinyltoluene, etc., are exemplified, and at least one selected from these can be used. Among them, styrene is particularly preferred. Among these polymers containing a functional group, a styrene-maleic anhydride copolymer is most preferred.

As an epoxy compound, which can be suitably used in the present invention, (1) an epoxy resin which can be prepared by condensing a polyhydric phenol (for example, bisphenol A, tetrabromobisphenol A, resorcinol, and hydroquinone) and epichlorohydrine, (2) an epoxy resin which can be prepared by condensing a polyhydric alcohol (for example, ethylene glycol, propylene glycol, butylene glycol, a polyethylene glycol, a polypropylene glycol, pentaerythritol, and trimethylolethane, etc.) and epichlorohydrine, (3) a glycidyl etherified product of monohydric alcohols and monohydric phenols, for example, phenyl glycidyl ether, butylglycidyl ether, and cresylglycidyl ether, (4) a glycidyl derivative of an amino compound, for example, a glycidyl derivative of aniline, and (5) an epoxidized product of a higher olefin or cycloalkene, or a natural unsaturated oil (for example, a soy bean) and an epoxidized product of the liquid diene polymer, are exemplified.

A polyolefin oxide wax, which is suitably used in the present invention, is known, and an explanation thereof and a producing method thereof are described in U.S. Pat. Nos. 3,822,227, and 3,756,999, and German Patent Publication Examined No. 3047915, and No. 2201862. Generally, they are produced by an oxidation, or an oxidation in suspension of a polyolefin.

A characteristic feature of a quinone compound, which is suitably used in the present invention, is as follows. That is, it has at least one 6 membered carbon ring in the molecule of an unsubstituted derivative, has at least two carbonyl groups in the ring structure (both of them may be in the same ring, and may be in a different ring, when it has at least two rings, provided that they occupy the position corresponding to a 1,2-position or a 1,4-position in a quinone having a single ring), and has at least two C—C double bond in the ring structure (this C—C double bond and a C—O double bond in carbonyl reside in the ring structure, and the C—C double bond and a C—O double bond in carbonyl are conjugated each other). When at least two rings reside in an unsubstituted quinone, these rings may be condensed non-condensed or both. Each other of non-condensed ring may be linked by the C—C double bond directly, or a hydrocarbon group having conjugated unsaturated bond such as =C—C=.

Further, a substituted quinone is also included in the present invention. When the substitution is desired, the degree of substitution may be from 1 to the maximum number of a hydrogen atom which can be substituted. As an example of a various kinds of a substituted groups which can reside in a structure of a non-substituted quinone, a halogen such as chlorine, bromine, fluorine, etc., a hydrocarbon group such as a branched or non-branched, or a saturated or unsaturated alkyl group, an aryl group, an alkyl aryl group, a cycloalkyl group, a halogenated derivative thereof, and a similar hydrocarbon group thereto having a hetero atom such as particularly oxygen, sulfur, or phosphorus (these groups link to a quinone ring via the hetero atom, such as by an oxygen bond), are exemplified.

Examples of various kinds of quinones include: 1,2-benzoquinone, 1,4-benzoquinone, 2,6-diphenylquinone, tetramethyldiquinone, 2,2'-diphenoquinone, 4,4'-diphenoquinone, 1,2-naphtoquinone, 1,4-naphtoquinone, 2,6-naphtoquinone, chloranils, 2-chloro-1,4-benzoquinone, and 2,6-dimethylbenzoquinone, etc.

A characteristic feature of an organosilane compound, which is suitably used as a compatibilizer of the present invention, is that it has in the molecule thereof (a) at least one silicon atom linked with carbon via an oxygen bond, and (b) at least one of a C—C double bond, a C—C triple bond or a functional group selected from the group consisting of an amine group and a mercapto group (provided that these functional groups do not directly link to a silicon atom).

In these compounds, the moiety, C—O—Si, usually resides as an alkoxyl group or an acetoxyl group which is directly linked with a silicon atom, and the alkoxyl group and the acetoxyl group generally have a number of carbon atoms of less than 15, and may contain a hetero atom (for example, oxygen). Moreover, in these compounds, at least two silicon atoms may reside, and when so many of silicon atoms reside, they link via an oxygen bond (for example, a siloxane), a silicon bond, or a bifunctional organic group (for example, a methylene group and a phenylene group).

Examples of suitable organosilane compounds include, γ-aminopropyltriethoxysilane, 2-(3-cyclohexanyl) ethyltrimethoxysilane, 1,3-divinyl tetraethoxysilane, vinyl tris-(2-methoxyethoxy)silane, 5-bicycloheptenyl triethoxysilane, and γ-mercaptopropyl trimethoxysilane.

Multifunctional compounds, which are suitable as a compatibilizer of the present invention, are of three types. The first type of a multifunctional compound has in the molecule thereof, both (a) a C—C double bond or a C—C triple bond, and (b) at least one of a carboxylic acid group, an acid anhydride group, an acid halide group, an anhydride group, an acid halide anhydride group, an acid amide group, an acid ester group, an imido group, an amino group, or a hydroxyl group. Examples of a multifunctional compound include amongst others: a maleic acid, a maleic anhydride, a fumaric acid, a citraconic acid, an itaconic acid, a maleimide, a maleic hydrazide, a reaction product of diamine and carboxylic acids selected from a maleic anhydride, a maleic acid, a fumaric, acid, etc., a dichloromaleic anhydride, a maleic amide, an unsaturated dicarboxylic acid (for example, an acrylic acid, a butenic acid, a methacrylic acid, a t-ethylacrylic acid, a pentenic acid, a decenic acid, an undecenic acid, a dodecenic acid, a linolic acid, etc.), an ester, an acid amide or anhydride of the above-described dicarboxylic acids, an unsaturated alcohol (for example, an alkyl alcohol, a crotyl alcohol, a methyl vinyl calbinol, 4-pentene-1-ol, 1,4-hexadiene-3-ol, 3-butene-1,4-diol, 2,5-dimethyl-3-hexene-2,5-diol, and alcohols having the formulae of $C_nH_{2n-5}OH$, $C_nH_{2n-7}OH$, and $C_nH_{2n-9}OH$, (provided that n is a positive integer to 30), an unsaturated amine obtainable by replacing a —OH group (one or plural) of the above-described unsaturated alcohol with an $NH_2$ group, and a diene polymer and a diene copolymer which are provided with a functional group. Among these, a compatibilizer, which is preferred for the composition of the present invention, is a maleic anhydride, and a fumaric acid. This type of a compatibilizer can be preliminarily mixed with a polyphenylene ether in the composition of the present invention.

A compound of a multifunctional compatibilizer of the second group, which is suitably used in the present invention, is characterized by possessing both (a) a group represented by the formula (OR) (in the formula, R is a hydrogen, an alkyl group, an aryl group, an acyl group, or a carbonyldioxyl group.), and (b) at least two groups selected from the group consisting of a carboxylic acid, an acid halide, an acid anhydride, an anhydride, an acid halide anhydride, an acid ester, an acid amide, an imido, an amino, and a salt thereof, which may be the same or different. A typical example of a compatibilizer of this group is an aliphatic polycarboxylic acid, an ester thereof, and an acid amide thereof, represented by the following formula.

$$(R^{I}O)_m R(COOR^{II})_n (CONR^{III}R^{IV})_s$$

wherein R is a linear or a branched saturated aliphatic hydrocarbon having carbon atoms of 2 to 20, preferably of 2 to 10, $R^I$ is hydrogen, or is selected from the group consisting of an alkyl group, an aryl group, an acyl group and a carbonyldioxy group, having 1 to 10 carbon atoms, preferably 1 to 6, most preferably 1 to 4, $R^{II}$ is each independently hydrogen, or is selected from the group consisting of an alkyl group and an aryl group, having 1 to 20 carbon atoms, preferably 1 to 10, $R^{III}$ and $R^{IV}$ is each independently hydrogen, or is selected from the group consisting essentially of an alkyl group and an aryl group, having 1 to 10 carbon atoms, preferably 1 to 6, most preferably 1 to 4, m equals to 1, (n+s) is at least 2, preferably equals to 2 or 3, and each of n and s is at least 0. Further, ($OR^I$) locates at the position of α or β to a carbonyl group, and at least two carbonyl groups are separated by 2 to 6 carbon atoms. Apparently, $R^I$, $R^{II}$, $R^{III}$ and $R^{IV}$ cannot be an aryl when a substituent of these has less than 6 carbon atoms.

Polycarboxylic acid useful in the present invention are exemplified, and can be used in the form of commercial products such as an anhydride, a hydrated acid, etc. suitable polycarboxylic acids are: citric acid, a malic acid, and an agaric acid, are exemplified. Among these, citric acid and malic acid are the preferred compatibilizers.

Examples of acid esters, useful in the present invention, include: acetyl citrate, and monostearyl citrate and/or distearyl citrate.

Examples of acid amides, useful and suitable in the present invention include: N,N'-diethyl citric amide, N-phenyl citric amide, N-dodecyl citric amide, N,N'-didodecyl citric amide, and N-dodecyl malic amide.

The characteristic feature of a compound of a multifunctional compatibilizer of the third group, which is suitably used in the present invention, is that it possesses, in the molecule thereof, both of (a) an acid halide group, most preferably, an acid chloride group, and (b) at least one group consisting of a carboxylic acid group, a carboxylic acid anhydride group, and an acid ester group, or an acid amide group, preferably, of a carboxylic acid group, and a carboxylic acid anhydride group.

Examples of a compatibilizer which fall in this group include: a trimellitic acid anhydride halide, a chloroformylsuccinic acid anhydride, a chloroformylsuccinic acid, a chloroformylglutaric acid anhydride, a chloroformylglutaric acid, a chloroacetylsuccinic acid anhydride, a chloroacetylsuccinic acid, a trimellitic acid halide, and a chloroacetylglutaric acid.

Furthermore, the above compatibilizer can be prereacted with at least one portion of the polyphenylene ether to use the compatibilizer as a PPE-functionalized compound.

The above-described compatibilizers are respectively described in U.S. Pat. Nos. 4,315,086, and 4,642,358. The above-described compatibilizers may be used alone, or may optionally be used in combination. Further, they may be directly added on melting and kneading, or they may be made to preliminarily react with either one or both of a polyphenylene ether and a polyamide, or with another resinous material which is used on production of the composition of the present invention.

A preferable amount of the compatibilizer is 0.01 to 20 parts by weight based on 100 parts by weight of the amount of a mixture of a polyamide and a polyphenylene ether, and a more preferable one is 0.1 to 10 parts by weight.

In the present invention, besides the above-described components, if necessary, an additive component may be added, so long as it does not harm the effect of the present invention.

Examples of the additive component are enumerated as follows.

That is, another thermoplastic resin such as a polyester, a polyolefin, etc., an inorganic filler (talc, kaolin, xonotlite, wollastonite, titanium oxide, potassium titanate, a carbon fiber, a glass fiber, etc.), known silane coupling agents to enhance affinity between an inorganic filler and a resin, a flame retardant (a halogenated resin, a silicone type flame retardant, magnesium hydroxide, aluminium hydroxide, an organic phosphoric ester compound, ammonium polyphosphate, red phosphorus, etc.), a fluorine type polymer showing a preventing effect of dropping, a plasticizer (an oil, a low molecular weight polyolefin, a polyethylene glycol, a fatty ester, etc.), an assistant to a flame retardant such as antimony trioxide, etc., various kinds of a peroxide, zinc oxide, zinc sulfide, an antioxidant, an ultraviolet absorber, a light stabilizer, etc., are exemplified.

The additive component may be added in a range of not exceeding in total 50 parts by weight based on 100 parts by weight of the total amount of (A) to (C) components.

Further, a component which is recommended to reside in a phase of a polyamide (an additive such as a nuclear agent for polyamide, a slip agent, various kinds of dyes, titanium oxide, a pigment such as carbon black for coloring, a mold releasing agent, etc.) may be added respectively in a range not exceeding 10 parts by weight based on 100 parts by weight of the total amount of (A) to (C) components. The additive component of these can surely be used in a combination of at least two kinds thereof.

The most important matter in the present invention is that the carbon type filler for an electrically conductive use resides in a phase of a polyphenylene ether.

Further, in a case where the composition of the present invention forms a morphology of dispersion so that the impact modifier is included in a phase of the polyphenylene ether, it is preferable that among all of fillers for an electrically conductive use, most thereof reside outside of the impact modifier, but not more than the largest half of all of the carbon type fillers for an electrically conductive use which reside in the phase of the polyphenylene ether, may be contained in the impact modifier.

When the carbon type fillers for an electrically conductive use do not reside in a phase of a polyphenylene ether, and, for instance, most thereof reside in a phase of a polyamide, and/or an impact modifier, a balance of a coefficient of linear expansion and an impact resistance, and fluidity are caused to deteriorate, and an amount of fines caused by pelletizing, which are generated when processing of extrusion is conducted, becomes very large.

Confirmation that the carbon type filler for an electrically conductive use resides in a phase of a polyphenylene ether, can be determined by the methods as follows.
(1) A central part of a sample of pellet is cut into an ultra-thin slice with an ultra-microtome so as to observe a flowing direction. Conditions of cutting include: a temperature not higher than 0° C., preferably not higher than −30° C., a thickness of the slice: 60 to 80 nm)
(2) The ultra-thin slice prepared is left to stand for 5 to 60 min. in an atmosphere of a vapor of ruthenium tetroxide, and is dyed.
(3) The dyed ultra-thin slice is observed at a magnification of about 20,000 with a transmission electron microscope.

In this condition, a phase showing a grey color is a phase of a polyphenylene ether, and a phase of an impact modifier shows non-dyed color (white) or black depending upon the kinds thereof.

Presence of a carbon type filler for an electrically conductive use, for instance, when the carbon type filler for an electrically conductive use is a carbon black for an electrically conductive use, is observed by an appearance of particles interspersed. The appearances are different depending upon the kinds of a carbon type filler for an electrically conductive use, but discrimination thereof can be easily determined from difference of a morphology of a dispersion by a person skilled in the art.

In the present invention, a preferable ratio of particles of a polyphenylene ether, wherein a carbon type filler for an electrically conductive use resides, based on all particles of a polyphenylene ether, is preferred to satisfy the following equation.

$$R \geq (t/r)$$

wherein R represents the ratio of an amount of particles of a polyphenylene ether, wherein a carbon type filler for an electrically conductive use resides, based on an amount of all particles of a polyphenylene ether, as shown in an electron microscope photograph which was taken at a magnification of 20,000 in a range of 50 μm$^2$ or broader, r represents an average diameter(nm) of a dispersion of a polyphenylene ether in a direction of a minor axis, and t represents a thickness of the ultra-thin slice, When the morphology is such that an impact modifier is included in a phase of a polyphenylene ether, presence of a carbon type filler, for an electrically conductive use, in the impact modifier can be recognized by observing a non-dyed ultra-thin slice with a transmission electron microscope.

A preferable method for causing the carbon type filler for an electrically conductive use to reside in a phase of a polyphenylene ether, which is a characteristic feature of the present invention, is to preliminarily mix and knead the carbon type filler for an electrically conductive use with the impact modifier.

Particularly, it is more effective to add the carbon type filler for an electrically conductive use in a form of a master batch wherein it has been preliminarily mixed and kneaded with the impact modifier.

A suitable amount of the carbon type filler for an electrically conductive use which is preliminarily mixed and kneaded with the impact modifier, is at least 10% by weight, preferably at least 30% by weight, more preferably at least 50% by weight, based on all of the carbon type filler used for an electrically conductive use.

Further, the ratio of the carbon type filler for an electrically conductive use and the impact modifier, is preferably 3 to 50 parts by weight, more preferably 5 to 30 parts by weight, of the carbon type filler for an electrically conductive use, based on 100 parts by weight of the impact modifier.

When the carbon type filler for an electrically conductive use is preliminarily mixed and kneaded with the impact modifier, a polyphenylene ether may be made to reside therein. When the polyphenylene ether is made to reside therein, the suitable amount of a polyphenylene ether in a mixture of an impact modifier and a polyphenylene ether is preferably not more than 90% by weight, more preferably not more than 70% by weight, most preferably not more than 50% by weight.

To cause a carbon type filler for an electrically conductive use to reside in a phase of a polyphenylene ether, when the amount of the polyphenylene ether in a mixture of the impact modifier and the polyphenylene ether is made to be not less than 90% by weight, an increase of a melting viscosity is incurred, and a processing property becomes inferior.

The reason why a carbon type filler for an electrically conductive use resides in a phase of a polyphenylene ether, although the carbon type filler for an electrically conductive use is added in a form of a master batch wherein the filler has been preliminarily mixed and kneaded with an impact modifier, is thought to be as follows, though it is only a presumption.

Generally, secondary amines are provided at the terminal ends of a polyphenylene ether, and the secondary amines raises an interaction with a carboxylic acid group, etc. residing on a surface, for instance, of a carbon black for an electrically conductive use. It is presumed that due to the interaction, the carbon type filler for an electrically conductive use becomes easy to stably reside in a polyphenylene ether.

As a specific processing machine to obtain the composition of the present invention, for instance, a monoaxial extruder, a biaxial extruder, a roll, a kneader, a Brabender Plastograph, a Bambury mixer, etc., are mentioned. Among them, a biaxial extruder is preferable, and particularly a biaxial extruder, which is provided with a feed opening at an upstream side and at least one feed opening at a downstream side, is most preferable.

A temperature of mixing and kneading thereon is not especially limited, but, a condition so that a suitable composition can be obtained may be optionally selected from the range of 240 to 360° C.

Specific methods of the present invention include: (1) a method wherein an impact modifier, a carbon type filler for an electrically conductive use, and a polyphenylene ether are supplied from a feed opening at an upstream side, and are mixed and kneaded, and then a polyamide is supplied from a feed opening at a downstream side, and are mixed and kneaded, (2) a method wherein an impact modifier, a part of a carbon type filler for an electrically conductive use, and a polyphenylene ether are supplied from a feed opening at an upstream side, and are mixed and kneaded, and then a polyamide and the rest of a carbon type filler for an electrically conductive use are supplied from a feed opening at a downstream side, and are mixed and kneaded, (3) a method wherein a part of an impact modifier, a carbon type filler for an electrically conductive use, and a polyphenylene ether are supplied from a feed opening at an upstream side, and are mixed and kneaded, and then a polyamide and the rest of an impact modifier are supplied from a feed opening at a downstream side, and are mixed and kneaded, (4) a method wherein a part of an impact modifier, a part of a carbon type filler for an electrically conductive use, and a polyphenylene ether are supplied from a feed opening at an upstream side, and are mixed and kneaded, and then a polyamide, the rest of an impact modifier, and the rest of a carbon type filler for an electrically conductive use, are supplied from a feed opening at a downstream side, and are mixed and kneaded, (5) a method wherein a master batch having been obtained by preliminarily mixing and kneading an impact modifier and a carbon type filler for an electrically conductive use, and a polyphenylene ether are supplied from a feed opening at an upstream side, and are mixed and kneaded, and then a polyamide is supplied from a feed opening at a downstream side, and are mixed and kneaded, (6) a method wherein a master batch having been obtained by preliminarily mixing and kneading an impact modifier and a part of a carbon type filler for an electrically conductive use, and a polyphenylene ether are supplied from a feed opening at an upstream side, and are mixed and kneaded, and then a polyamide and the rest of a carbon type filler for an electrically conductive use are supplied from a feed opening at a downstream side, and are mixed and kneaded, (7) a method wherein a master batch having been obtained by preliminarily mixing and kneading three kinds of an impact modifier, a part of a polyphenylene ether and a part of a carbon type filler for an electrically conductive use, and the rest of a polyphenylene ether are supplied from a feed opening at an upstream side, and are mixed and kneaded, and then a polyamide and the rest of a carbon type filler for an electrically conductive use are supplied from a feed opening at a downstream side, and are mixed and kneaded, (8) a method wherein a master batch having been obtained by preliminarily mixing and kneading an impact modifier and a part of a carbon type filler for an electrically conductive use, and a polyphenylene ether are supplied from a feed opening at an upstream side, and are mixed and kneaded, and then a part of a polyamide, and a master batch having been obtained by preliminarily mixing and kneading the rest of a polyamide and the rest of a carbon type filler for an electrically conductive use, are supplied from a feed opening at a downstream side, and are mixed and kneaded. A method of using a master batch as in (5) to (8) is preferred, but any method may be used so long as a carbon type filler for an electrically conductive use, resides in the polyphenylene ether phase.

A temperature of mixing and kneading on producing a master batch is not especially limited, but, a condition so that a suitable composition can be obtained may be optionally selected from the range of 150 to 300° C.

The composition of the present invention thus obtainable can be molded to produce molded articles of various kinds, by various conventionally known methods, for instance, such as injection molding, extrusion molding, and blow molding.

The composition of the present invention can be used to produce articles such as a exterior parts of a motorbike, such as a cowl, etc.; for interior parts of an automobile, for exterior panels or exterior parts of an automobile, such as a fender, a door panel, a front panel, a rear panel, a locker panel, a rear bumper panel, a back door garnish, an emblem garnish, a panel for a feeding port of a fuel, an over fender, an outer door handle, a door mirror housing, a bonnet air intake, a bumper, a bumper guard, a roof rail, a roof rail leg, a pillar cover, a wheel cover; for various kinds of air parts, etc., and in parts of an IC tray, etc.; in the electrical or electronic fields. Among them, the composition is particularly suitably for exterior automobile parts which are to be subjected to electrostatic coating.

EXAMPLES

Hereinafter, the present invention is explained in detail by referring to examples and comparative examples.
A Raw Material Used:
(1) A polyphenylene ether Poly(2,6-dimethyl-1,4-phenylene ether)
(1-1) A reduced viscosity (measured as a 0.5 g/dl of chloroform solution, at 30° C.)=0.52 dl/g (hereinafter abbreviated as "PPE-H")
(1-2) A reduced viscosity=0.42 dl/g (hereinafter abbreviated as "PPE-L")
(2) A polyamide
(2-1) A polyamide 6,6 resin (hereinafter abbreviated as "PA-66")
A number average molecular weight=16,000
A concentration of a terminal amino group=50 m equivalent/kg
A concentration of a terminal carboxyl group=80 m equivalent/kg
This contains as a minute amount of component, 100 ppm of a copper type thermal stabilizer and 800 ppm of a slip agent (a salt of a metallic stearate).
(2-2) A polyamide 6 resin (hereinafter abbreviated as "PA-6")
A relative viscosity in a sulfuric acid (1 g of a polymer/100 ml of a 98% of sulfuric acid, measured at 25° C.)=2.6
A concentration of a terminal amino group=45 m equivalent/kg
A concentration of a terminal carboxyl group=65 m equivalent/kg
(2-3) A polyamide 6,6 resin (hereinafter abbreviated as "PA-66L")
A number average molecular weight=9,100
A concentration of a terminal amino group=55 m equivalent/kg
A concentration of a terminal carboxyl group=65 m equivalent/kg
This contains as a minute amount of component, 100 ppm of a copper type thermal stabilizer and 800 ppm of a slip agent (a salt of a metallic stearate).
(3) An impact modifier
(3-1) An ethylene-octene copolymer (hereinafter abbreviated as "EOR")
A content of octene=24% by weight
MFR=30 g/10 min. (measured at 190° C., and 2.16 kg of a load)
mp=60° C. (a DSC method, a speed of raising temperature 10° C./min.)
(3-2) A modified product of an ethylene-octene copolymer with a maleic anhydride (hereinafter abbreviated as "MEOR")

A content of octene=28 wt %
MFR=0.8 g/10 min. (measured at 190° C., and 2.16 kg of a load)
mp=55° C. (a DSC method, a speed of raising temperature 10° C./min.)
A ratio of a maleic anhydride added=1.0 wt %
(3-3) A 3 type hydrogenated styrene-butadiene copolymer having a high molecular weight (hereinafter abbreviated as "HTR1")
A linking style=3 type (ABA type) block
[Component A is a Styrene Block, and Component B is a Butadiene Block.]
A styrene content=33 wt %
A total amount of a vinyl content=33 wt %
A number average molecular weight=150,000
(3-4) A 3 type hydrogenated styrene-butadiene copolymer having a low molecular weight (hereinafter abbreviated as "HTR2")
A linking style=3 type (ABA type) block
[Component A is a Styrene Block, and Component B is a Butadiene Block.]
A styrene content=29 wt %
A total amount of a vinyl content=32 wt %
A number average molecular weight=51,000
(3-5) A 4 type hydrogenated styrene-butadiene copolymer having a low molecular weight (hereinafter abbreviated as "HTR3")
A linking style=4 type (ABAB type) block
[Component A is a Styrene Block, and Component B is a Butadiene Block.]
A styrene content=29 wt %
A total amount of a vinyl content=32 wt %
A number average molecular weight=51,000
(3-6) An oil-containing 4 type hydrogenated styrene-butadiene copolymer having a high molecular weight (hereinafter abbreviated as "HTR4")
A linking style=4 type (ABAB type) block
[Component A is a Styrene Block, and Component B is a Butadiene Block.]
A styrene content=35 wt %
A total amount of a vinyl content=36 wt %
A number average molecular weight=120,000
A paraffin oil=a trade name PW-380 manufactured by Idemitsu Kosan Co., Ltd.
A content of a paraffin oil=50 parts by weight based on 100 parts by weight of a hydrogenated styrene-butadiene copolymer
(4) A carbon type filler for an electrically conductive use (hereinafter abbreviated as "KB")
A carbon black for an electrically conductive use [a trade name: Ketjen Black EC-600JD]
An amount of absorbing DBP=495 ml/100 g
A BET surface area=1,270 m$^2$/g
(5) A carbon type filler for a non-electrically conductive use (hereinafter abbreviated as "CB")
A carbon black for a coloring use [a trade name: Mitsubishi Carbon Black RCF #45]
An amount of absorbing DBP=53 ml/100 g
A BET surface area=115 m$^2$/g
(6) A styrene type thermoplastic resin (hereinafter abbreviated as "PS")
A homopolystyrene
A molecular weight=250,000
(7) A compatibilizer (hereinafter abbreviated as "MAH")
A maleic anhydride [manufactured by Nippon Yushi K. K.]

Preparation Example 1
Preparation of EOR-15% MB

A temperature of a cylinder of a biaxial extruder [ZSK-25: manufactured by Werner & Pfleiderer Co. (Germany)] which has one feed opening at the upstream side and another feed opening at the central part thereof, was set at 220° C. From the feed opening at the upstream side (hereinafter abbreviated as "Top-F"), EOR was supplied at a constant rate of 8.5 kg/h, and from the feed opening at the central part thereof (hereinafter abbreviated as "Side-F"), KB was supplied at a constant rate of 1.5 kg/h, and they were melted and kneaded to pelletize.

A number of revolutions of the screw was 300 revolutions/min. To remove volatile components, a vent for vacuum was provided at a position between the Side-F and a die, and suction applied to the vent.

A master pellet (a concentration containing KB of 15 wt %) as obtained herein, is abbreviated as EOR-15% MB.

Preparation Example 2
Preparation of PA66-10% MB

Using the same extruder as in Preparation Example 1, a cylindrical temperature thereof was set at 280° C. From the Top-F, PA66 was supplied at a constant rate of 10 kg/h, and from the Side-F, KB was supplied at a constant rate of 1.11 kg/h, and they were melted and kneaded to pelletize.

A number of revolutions of the screw was 320 revolutions/min. To remove a volatile component, a vent for vacuum was provided at a position between the Side-F and a die, and suction to a vacuum was conducted.

A master pellet (a concentration containing KB of 10 wt %) as obtained herein, is abbreviated as PA66-10% MB.

Preparation Example 3
Preparation of PA66L-10% MB

The same procedure as Preparation Example 2 was conducted except that PA66 was changed to PA66L, to obtain a master pellet.

A master pellet (a concentration containing KB of 10 wt %) as obtained herein, is abbreviated as PA66L-10% MB.

Preparation Example 4
Preparation of HTR2-10% MB

The same procedure as Preparation Example 1 was conducted except that EOR was changed to HTR2, and from the Top-F, HTR2 was supplied at a constant rate of 9 kg/h, and from the Side-F, KB was supplied at a constant rate of 1 kg/h, to obtain a master pellet.

A master pellet (a concentration containing KB of 10 wt %) as obtained herein, is abbreviated as HTR2-10% MB.

Preparation Example 5
Preparation of HTR2-17% MB

The same procedure as Preparation Example 4 was conducted except that from the Top-F, HTR2 was supplied at a constant rate of 8.3 kg/h, and from the Side-F, KB was supplied at a constant rate of 1.7 kg/h, to obtain a master pellet.

A master pellet (a concentration containing KB of 17 wt %) as obtained herein, is abbreviated as HTR2-17% MB.

Preparation Example 6
Preparation of HTR3-10% MB

The same procedure as Preparation Example 4 was conducted except that HTR2 was changed to HTR3, to obtain a master pellet.

A master pellet (a concentration containing KB of 10 wt %) as obtained herein, is abbreviated as HTR3-10% MB.

Preparation Example 7
Preparation of HTR4-10% MB

The same procedure as Preparation Example 4 was conducted except that HTR2 was changed to HTR4, to obtain a master pellet.

A master pellet (a concentration containing KB of 10 wt %) as obtained herein, is abbreviated as HTR4-10% MB.

Preparation Example 8
Preparation of KI-MB

To a biaxial extruder [PCM-30: manufactured by Ikegai Tekko Co.] of which a cylindrical temperature was set at 280° C., and which has one feed opening at the upstream side, PA66L at a constant rate of 9.6 kg/h, and a powder-like potassium iodide (hereinafter abbreviated as "KI") at a constant rate of 0.4 kg/h, were supplied respectively from separate feeders, and they were melted and kneaded to pelletize.

A master pellet (a concentration containing KI of 4 wt %) as obtained herein, is abbreviated as KI-MB.

Preparation Example 9
Preparation of MPPE

A blend was obtained by dry blending 2 parts by weight of MAH and 0.3 parts by weight of a radical initiator [Perhexa 25B: manufactured by NOF CORPORATION] with 100 parts by weight of PPE, and it was supplied to a biaxial extruder [PCM-30: manufactured by Ikegai Tekko Co.] of which a cylindrical temperature was set at 320° C., and which has one feed opening at the upstream side, and they were melted and kneaded, to pelletize.

Next, taking 1 g of the pellets obtained, putting them between what has been obtained by superposing a polytetrafluoroethylene sheet, an aluminum sheet, and an iron plate in this order from the inner side, by using a press molding machine set at a temperature of 280° C., a compression molding was conducted at a pressure of 100 kg/cm$^2$ to obtain a film.

A measurement of an infrared scpectrophotometric analysis concerning the obtained film was conducted with a Fourier transform infrared spectrophotometer of FT/IR-420 type manufactured by Nippon Bunko Co.

According to the measurement concerning the film, a peak originated from maleic acid added to the polyphenylene ether was observed at 1790 cm$^{-1}$.

The ratio of MAH added was 0.54 wt %, as calculated from the equation of a calibration curve preliminarily prepared by using a mixture of PPE and MAH.

The MAH modified PPE as obtained herein is abbreviated as "MPPE".

Next, each of measuring methods is explained in detail.
(Volume Inherent Resistance-1)

Both ends of a test piece for tensile test having a thickness of 3.2 mm were cut with a precision cut-off saw to obtain a test piece of a rectangular shape which possesses a length of 50 mm, and possesses a cut area having a uniform sectional area (12.4×3.2 mm) at both ends. The cut areas at both ends of this test piece were coated with a silver paste, and were dried. After that, the value of resistance between the ends was measured with a circuit tester, and volume inherent resistance was calculated by using the equation (a). A value of the volume resistance is represented as volume inherent resistance-1, and the value was described in Tables 1–4.
(Volume Inherent Resistance-2)

At the central parts of the surfaces facing each other of 50 mm×2.5 mm of a molded piece of a plate shape which has a length of 90 mm, a width of 50 mm, and a thickness of 2.5 mm, respectively, areas of 30 mm×2.5 mm were coated with a silver paste, and were dried. After that, the value of resistance between the ends was measured with a circuit tester. This was done five times with different plates, and an average value was calculated, and volume inherent resistance was calculated by using the equation (a) as described below.

$$VR = R \cdot w \cdot t / 1 \qquad (a)$$

wherein VR means volume inherent resistance (Ω·cm), R is the average value of an addition of resistance measured with a circuit tester(Ω), w is the width of a part coated with a silver paste (cm), t is the height of a part coated with a silver paste (cm), 1 is the distance between the areas which were coated with a silver paste (cm).

A value of the volume inherent resistance is represented as volume resistance-2, and the value was described in Table 3.
(A Melt Flow Rate: MFR)

According to a method based on ISO 1133, it was conducted at 280° C., and at a load of 5 kg.
(A Coefficient of Linear Expansion)

A center part of a test piece for tensile test having a thickness of 3.2 mm were cut with a precision cut-off saw to obtain a quadrangular pillar shape which has a thickness of 3.2 mm, a width of 5 mm, and a length of 10 mm. By using TMA-7 [manufactured by Perkin-Elmer Co.], a coefficient of linear expansion thereof was measured by raising a temperature thereof from 23° C. to 70° C. at a raising speed of 5° C./min, based on JIS K7197.
(An Izod Impact Test)

Izod impact strength notched of a test piece having a thickness of 3.2 mm was measured based on ASTM D-256.
(A Dart Impact Test)

A dart impact test was conducted using a molded piece of a plate shape which has a length of 90 mm, a width of 50 mm, and a thickness of 2.5 mm, by employing a graphic impact tester [manufactured by Toyo Seiki Seisaku-Sho Ltd.]

A testing method thereof is as follows. A test piece was clipped in a sample holder having a diameter of 40 mm, and a striker of a spherical shape (a weight thereof of 6.5 kg) having an apex diameter of 13 mm was made to fall freely from the height of 100 cm above the test piece, and the test piece was made to be broken. All of the energy required for the fracture thereon was measured, and was represented as all of the energy absorbed.

This test was carried out using 10 samples, and an average value of an addition of the values measured concerning 8 pieces excluding a maximum one and a minimum one was regarded as all of the energy absorbed of the sample.

Furthermore, states of the fracture of test pieces which were broken in the measurement, were observed and they were briefly classified as either a ductile fracture or a brittle fracture. A percentage of ductility was calculated from the ratio of the number of the ductile fractures among the 10 test pieces.

A percentage of ductility=(a number of the ductile fracture/10)×100 (An amount of fines caused by Pplletizing, which are generated when processing of extrusion is conducted)

At a spinning nozzle, a water bath (a strand bath) and a pelletizer were provided, and a drawing speed of the pelletizer was controlled so that a diameter of the strand having passed in the water bath but before the pelletizer is in a range of 2 mm to 3 mm. Thereon, a length of the strand to be dipped in the water bath was made to be 100 cm. In this connection, water temperature was 13° C.

Pellets from the pelletizer thereon were taken by about 100 g, and a precise weight thereof was measured. The value is taken as W1.

Next, the pellets from the pelletizer of which a precise weight was measured, were spread on a woven metallic wire screen of 20 mesh, and were well shaken. After fractionating pellets and fines caused by pelletizing, a precise weight of the pellets remaining on the woven metallic wire was measured. The value is taken as W2.

The ratio of fines caused by pelletizing (W %) was calculated from W1 and W2 of these, by using the following equation.

$$W\% = (1 - W2/W1) \times 100$$

(An Adhesion Property with Coats)

According to the method as described in JP-A-60-65035, a molded piece in the form of a plate which has a length of 90 mm, a width of 50 mm, and a thickness of 2.5 mm, was coated with a thermosetting acrylic resin coating material diluted with an exclusively used thinner by using a spray gun. It was left to stand at a room temperature for 30 min., and was thermally cured at 150° C. for 30 min., and a coated material was obtained. Next, a peeling test using a checkerboard having a division of a square of 1 mm length concerning coats of the coated material was conducted based on JIS K5400-1979, and a number of divisions which did not peel off, among 100, was calculated.

Example 1

A cylindrical temperature of Top-F to Side-F of a biaxial extruder [ZSK-40: manufactured by Werner & Pfleidere Co. (Germany)] which has one feed opening at the upstream side and another feed opening at the central part thereof, was set at 320° C., and that of Side-F to a die was set at 280° C. From Top-F and Side-F, respectively, what are dry blended in a ratio as described in Example 1 of Table 1 were supplied, and they were melted and kneaded to pelletize. The amount of fines caused by pelletizing, which were generated when processing of extrusion was conducted, was measured at the same time.

In this connection, a number of revolutions of the screw thereon was 300 revolutions/min. To remove the volatile components, a vent for vacuum was provided at two positions, one just before the Side-F and one between the Side-F and the die, and suction was applied to the vent.

By using an injection molding machine [IS-80EPN: manufactured by Toshiba Kikai Co. (Japan)] set at a cylindrical temperature of 290° C. and at a mold temperature of 80° C., the obtained pellets were molded to obtain a molded piece necessary for each of the measurements. The results were also described in Table 1.

Further, to confirm that KB, which is a carbon type filler for an electrically conductive use, resides in a phase of PPE, a central part of a pellet obtained was cut with an ultramicrotome in a direction perpendicular to a flowing direction in the form of an ultra-thin slice (conditions of cutting: a temperature of cutting: −40° C., thickness of the slice: 70 nm), and the ultra-thin slice prepared was left to stand for 20 min. in an atmosphere of a vapor of ruthenium tetroxide, and is dyed. The dyed ultra-thin slice was taken at a magnification of about 20,000 with a transmission electron microscope, and as a result, the presence of carbon in a phase of PPE could be confirmed. The electron microscope photograph obtained was shown in FIG. 1, and a schematic drawing thereof was shown in FIG. 2. (In the schematic drawing, a part encircled with a black line indicates a phase of a polyphenylene ether, and a black dot indicates KB.)

Figure 1:
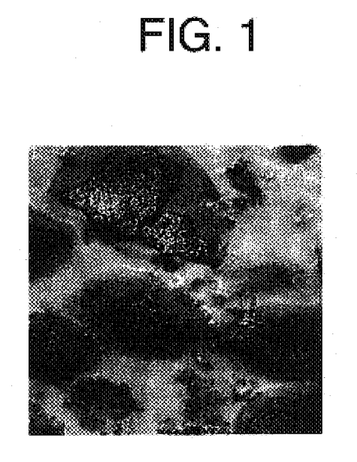
FIG. 1 is a drawing of seeing through a transmission electron microscope a super sliced piece of pellets of Example 1.
Figure 2:
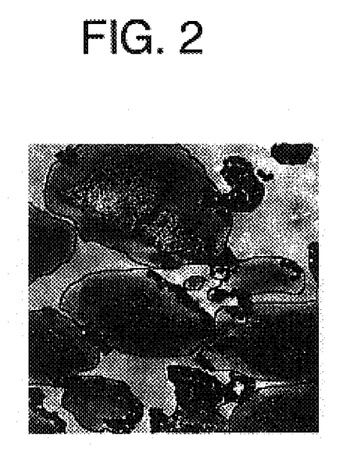
FIG. 2 is a schematic drawing of an electron microscope in FIG. 1.

From these Figures, an appearance can be recognized wherein a phase of a polyphenylene ether showing a grey color resides in a continuous phase of a polyamide, and in the phase of a polyphenylene ether, KB is interspersed in a state of particles.

Comparative Example 1

The same procedure as in Example 1 was conducted except that the composition formulated was changed to the ratio described in Comparative Example 1 of Table 1. In this connection, the final composition of the present Comparative Example is quite the same composition as that of Example 1.

Further, to confirm a location of KB, which is a carbon type filler for an electrically conductive use residing, a photograph was taken with a transmission electron microscope, as in Example 1. The electron microscope photograph obtained is shown in FIG. 3, and a schematic drawing thereof is shown in FIG. 4.

Figure 3:
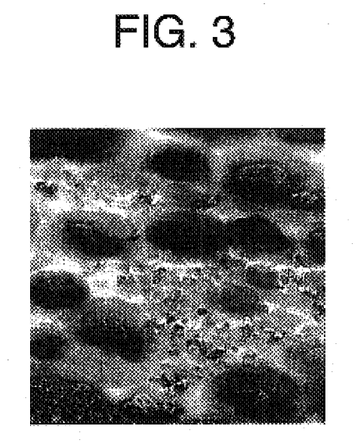
FIG. 3 is a drawing of seeing through a transmission electron microscope a super sliced piece of pellets of Comparative Example 1.
Figure 4:
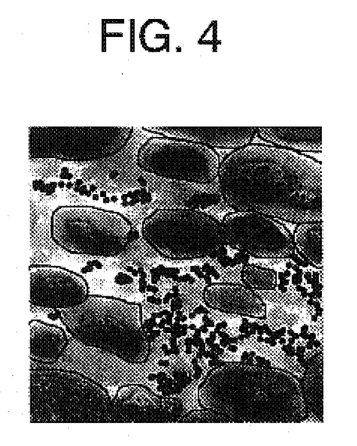
FIG. 4 is a schematic drawing of an electron microscope in FIG. 3.

From FIGS. 3 and 4, the presence of KB in a phase of PPE could not be recognized. This is true because a phase of a polyphenylene ether showing a grey color resided in a continuous phase of a polyamide, but almost all of the KB was interspersed in the phase of a polyamide in the form of particles.

Examples 2 to 5 and Comparative Example 2

The same procedure as in Example 1 was conducted except that the compositions formulated were changed to the ratios described in Table 1. In this connection, the final compositions of the inventive Examples and Comparative Example are quite the same composition as those of Example 1 and Comparative Example 1.

The results are described in Table 1 below the composition of each of the Examples and the Comparative Examples.

TABLE 1

|   | unit | Example 1 | Example 2 | Example 3 | Example 4 | Example 5 | Comp. Ex. 1 | Comp. Ex. 2 |
|---|---|---|---|---|---|---|---|---|
| Top-F | | | | | | | | |
| PPE-L | wt part | 30 | 30 | 30 | 30 | 30 | 30 | 30 |
| MAH | wt part | 0.2 | 0.2 | 0.2 | 0.2 | 0.2 | 0.2 | 0.2 |
| HTR2 | wt part | | 17 | | 17 | | 17 | 17 |
| KB | wt part | | 3.5 | | 2 | | | |
| HTR2-10% MB | wt part | | | 19 | | 19 | | |
| HTR2-17% MB | wt part | 20.5 | | | | | | |
| Side-F | | | | | | | | |

TABLE 1-continued

|  | unit | Example 1 | Example 2 | Example 3 | Example 4 | Example 5 | Comp. Ex. 1 | Comp. Ex. 2 |
|---|---|---|---|---|---|---|---|---|
| PA66L | wt part | 49.5 | 49.5 | 36 | 36 | 49.5 | 19 | 49.5 |
| KB | wt part |  |  |  |  | 1.5 |  | 3.5 |
| PA66L-10% MB | wt part |  |  | 15 | 15 |  | 34 |  |
| Total | wt part | 100.2 | 100.2 | 100.2 | 100.2 | 100.2 | 100.2 | 100.2 |
| Composition |  |  |  |  |  |  |  |  |
| PE | wt % | 29.9 | 29.9 | 29.9 | 29.9 | 29.9 | 29.9 | 29.9 |
| MAH | wt % | 0.2 | 0.2 | 0.2 | 0.2 | 0.2 | 0.2 | 0.2 |
| HTR2 | wt % | 17.0 | 17.0 | 17.1 | 17.0 | 17.1 | 17.0 | 17.0 |
| PA66L | wt % | 49.4 | 49.4 | 49.4 | 49.4 | 49.4 | 49.5 | 49.4 |
| KB | wt % | 3.5 | 3.5 | 3.4 | 3.5 | 3.4 | 3.4 | 3.5 |
| Total | wt % | 100.0 | 100.0 | 100.0 | 100.0 | 100.0 | 100.0 | 100.0 |
| Presence of a carbon type filler for an electrically conductive use |  | yes | yes | yes | yes | yes | no | no |
| Volume inherent resistance-1 | $\Omega \cdot cm$ | $10^{6-7}$ | $10^{6-7}$ | $10^{5-6}$ | $10^{5-6}$ | $10^{5-6}$ | $10^{5-6}$ | $10^{5-6}$ |
| Fluidity (MFR) 280° C., 5 kg load | g/10 min | 57 | 50 | 36 | 32 | 27 | 23 | 18 |
| Coefficient of linear expansion 23° C.–70° C. | $\times 10^{-5} \, °C.^{-1}$ | 7.7 | 8.0 | 8.5 | 7.4 | 7.8 | 10.7 | 9.9 |
| Izod impact strength 23° C. | J/m | 186 | 178 | 158 | 130 | 138 | 157 | 143 |
| Amount of fines generated | wt % | 0.1 or less | 0.1 or less | 0.1 or less | 0.13 | 0.19 | 1.19 | 0.88 |

It has been proved that even though final compositions are quite the same, physical properties thereof are greatly differentiated depending upon whether or not KB resides in a phase of PPE.

Examples 6 to 10 and Comparative Examples 3 to 4

The same procedure as in Example 1 was conducted except that the compositions formulated were changed to the ratios described in Table 2. In this connection, the results are described in Table 2 below the composition of each of the Examples and the Comparative Examples.

TABLE 2

|  | unit | Example 6 | Example 7 | Example 8 | Example 9 | Example 10 | Comp. Ex. 3 | Comp. Ex. 4 |
|---|---|---|---|---|---|---|---|---|
| Top-F |  |  |  |  |  |  |  |  |
| PPE-L | wt part | 30 | 30 | 30 |  | 26 | 20 | 30 |
| MPPE | wt part |  |  |  | 30 |  |  |  |
| MAH | wt part | 0.2 | 0.2 | 0.2 |  | 0.2 | 0.2 | 0.2 |
| PS | wt part |  |  |  |  | 4 | 10 |  |
| HTR2 | wt part | 17 |  |  |  | 17 | 17 | 17 |
| CB | wt part |  |  |  |  |  | 3.5 |  |
| KB | wt part | 3.5 |  |  |  | 3.5 |  |  |
| HTR2-10% MB | wt part |  | 19 |  | 19 |  |  |  |
| HTR3-10% MB | wt part |  |  | 19 |  |  |  |  |
| Side-F |  |  |  |  |  |  |  |  |
| PA66L | wt part | 49.5 | 36 | 36 | 36 | 50 | 50 | 50 |
| KB | wt part |  |  |  |  |  |  | 0.3 |
| PA66L-10% MB | wt part |  | 15 | 15 | 15 |  |  |  |
| Total | wt part | 100.2 | 100.2 | 100.2 | 100 | 100.7 | 100.7 | 97.5 |
| Composition |  |  |  |  |  |  |  |  |
| PPE-L | wt % | 29.9 | 29.9 | 29.9 |  | 25.8 | 19.9 | 30.8 |
| MPPE | wt % |  |  |  | 30.0 |  |  |  |
| MAH | wt % | 0.2 | 0.2 | 0.2 |  | 0.2 | 0.2 | 0.2 |
| PS | wt % |  |  |  |  | 4.0 | 9.9 |  |
| HTR2 | wt % | 17.0 | 17.1 |  | 17.1 | 16.9 | 16.9 | 17.4 |
| HTR3 | wt % |  |  | 17.1 |  |  |  |  |

TABLE 2-continued

|  | unit | Example 6 | Example 7 | Example 8 | Example 9 | Example 10 | Comp. Ex. 3 | Comp. Ex. 4 |
|---|---|---|---|---|---|---|---|---|
| PA66L | wt % | 49.4 | 49.4 | 49.4 | 49.5 | 49.7 | 49.7 | 51.3 |
| CB | wt % |  |  |  |  |  | 3.5 |  |
| KB | wt % | 3.5 | 3.4 | 3.4 | 3.4 | 3.5 |  |  |
| Total | wt % | 100.0 | 100.0 | 100.0 | 100.0 | 100.0 | 100.0 | 99.7 |
| Presence of a carbon type filler for an electrically conductive use |  | yes | yes | yes | yes | yes | no | no |
| Volume inherent resistance-1 | $\Omega \cdot cm$ | $10^{6-7}$ | $10^{5-6}$ | $10^{5-6}$ | $10^{5-6}$ | $10^{6-7}$ | $\infty$ | $\infty$ |
| Fluidity (MFR) 280° C., 5 kg load | g/10 min | 50 | 36 | 43 | 33 | 55 | 85 | 125 |
| Coefficient of linear expansion 23° C.–70° C. | $\times 10^{-5}$ °C.$^{-1}$ | 8.0 | 8.5 | 8.2 | 7.9 | 9.0 | 10.3 | 11.3 |
| Izod impact strength 23° C. | J/m | 178 | 158 | 191 | 160 | 144 | 105 | 191 |
| Amount of fines generated | wt % | 0.1 or less | 0.1 or less | 0.1 or less | 0.15 | 0.23 | 0.52 | 0.1 or less |

It has been proved that when an amount used of a carbon type filler for an electrically conductive use is extremely small, or a carbon black for a coloring use is used instead of a carbon type filler for an electrically conductive use, a balance of physical properties is worsened.

Examples 11 to 13 and Comparative Examples 5 to 7

The same procedure as in Example 1 was conducted except that the compositions formulated were changed to the ratios described in Table 3. In Examples 11 to 13 and Comparative Examples 5 to 7, in addition to the valves given in Example 1, valves for volume inherent resistance-2 and a dart impact test are also given.

In this connection, the results are described under the headings in Table 3 for each of the inventive Examples and Comparative Examples.

As compared with volume inherent resistance-2, some scattering is observed in volume inherent resistance-1, but a large difference cannot be recognized between the two as a value of volume inherent resistance. This is believed to be because resistance is substantially measured between the cut surfaces, since at one end of a molded piece in the form of a plate, there is a gate of a film shape, and the portion is cut.

TABLE 3

|  | unit | Example 11 | Example 12 | Example 13 | Comp. Ex. 5 | Comp. Ex. 6 | Comp. Ex. 7 |
|---|---|---|---|---|---|---|---|
| Top-F |  |  |  |  |  |  |  |
| PPE-H | wt part | 30 | 30 | 30 | 30 | 30 | 30 |
| MAH | wt part | 0.3 | 0.3 | 0.3 | 0.3 | 0.3 | 0.3 |
| HTR1 | wt part | 10 | 10 | 10 | 10 | 10 | 10 |
| Side-F |  |  |  |  |  |  |  |
| PA66 | wt part | 45 | 45 | 22.5 | 24 | 32 | 2 |
| PA6 | wt part |  |  | 22.5 |  |  | 22.5 |
| EOR | wt part |  | 5 |  | 13 | 13.5 | 12.5 |
| MEOR | wt part | 2 | 2 | 2 | 2 | 2 | 2 |
| PA66-10% MB | wt part |  |  |  | 23 | 15 | 23 |
| EOR-15% MB | wt part | 15 | 10 | 15 |  |  |  |
| Total | wt part | 102.3 | 102.3 | 102.3 | 102.3 | 102.8 | 102.3 |
| Composition |  |  |  |  |  |  |  |
| PPE-H | wt % | 29.3 | 29.3 | 29.3 | 29.3 | 29.2 | 29.3 |
| MAH | wt % | 0.3 | 0.3 | 0.3 | 0.3 | 0.3 | 0.3 |
| HTR1 | wt % | 9.8 | 9.8 | 9.8 | 9.8 | 9.7 | 9.8 |
| PA66 | wt % | 44.0 | 44.0 | 22.0 | 43.7 | 44.3 | 22.2 |
| PA6 | wt % |  |  | 22.0 |  |  | 22.0 |
| EOR | wt % | 12.5 | 13.2 | 12.5 | 12.7 | 13.1 | 12.2 |
| MEOR | wt % | 2.0 | 2.0 | 2.0 | 2.0 | 1.9 | 2.0 |
| KB | wt % | 2.2 | 1.5 | 2.2 | 2.2 | 1.5 | 2.2 |
| Total | wt % | 100.0 | 100.0 | 100.0 | 100.0 | 100.0 | 100.0 |
| Presence of a carbon type filler for an electrically conductive use |  | yes | yes | yes | no | no | no |
| Volume inherent resistance-1 | $\Omega \cdot cm$ | $10^{4-5}$ | $10^{5-6}$ | $10^{4-5}$ | $10^{4-5}$ | $10^{5-6}$ | $10^{4-5}$ |
| Volume inherent resistance-2 | $\Omega \cdot cm$ | $4.2 \times 10^4$ | $3.2 \times 10^5$ | $2.0 \times 10^4$ | $5.8 \times 10^4$ | $7.8 \times 10^5$ | $2.5 \times 10^4$ |
| Fluidity (MFR) 280° C., 5 kg load | g/10 min | 27 | 32 | 28 | 12 | 17 | 10 |
| Coefficient of linear expansion 23° C.–70° C. | $\times 10^{-5}$ °C.$^{-1}$ | 9.0 | 8.9 | 9.2 | 10.2 | 10.5 | 10.3 |

TABLE 3-continued

|  | unit | Example 11 | Example 12 | Example 13 | Comp. Ex. 5 | Comp. Ex. 6 | Comp. Ex. 7 |
|---|---|---|---|---|---|---|---|
| Izod impact strength 23° C. | J/m | 205 | 210 | 220 | 135 | 142 | 128 |
| Dart impact test |  |  |  |  |  |  |  |
| Al energy absorbed | J | 39.8 | 47.2 | 53.4 | 28.4 | 32.3 | 30.0 |
| Percentage of ductility | % | 100 | 100 | 100 | 0 | 20 | 10 |
| Amount of fines generated | wt % | 0.18 | 0.16 | 0.16 | 0.66 | 0.51 | 1.09 |

Comparative Examples respectively corresponding to inventive Examples 11, 12, and 13 are Comparative Examples 5, 6, and 7. It has been proved that physical properties are greatly different depending upon whether or not a carbon type filler for an electrically conductive use resides in a phase of PPE.

Examples 14 and 15

The same procedure as in Example 1 was conducted except that the compositions formulated were changed to the ratios described in Table 4. In Examples 14 and 15, in addition to the measuring valves in Examples 1, the valve of an adhesion property with coats was also determined.

In this connection, the results are described under the headings in Table 4 for each of the inventive Examples and Comparative Examples.

TABLE 4

|  | unit | Example 3 | Example 14 | Example 15 |
|---|---|---|---|---|
| Top-F |  |  |  |  |
| PPE-L | wt part | 30 | 30 | 30 |
| MAH | wt part | 0.2 | 0.2 | 0.2 |
| HTR2 - 10% MB | wt part | 19 |  |  |
| HTR4 - 10% MB | wt part |  | 19 | 19 |
| Side-F |  |  |  |  |
| PA66L | wt part | 36 | 36 | 31 |
| KI-MB | wt part |  |  | 5 |
| PA66L - 10% MB | wt part | 15 | 15 | 15 |
| Total | wt part | 100.2 | 100.2 | 100.2 |
| Composition |  |  |  |  |
| PPE-L | wt % | 29.9 | 29.9 | 29.9 |
| MAH | wt % | 0.2 | 0.2 | 0.2 |
| HTR2 | wt % | 17.1 |  |  |
| HTR4 | wt % |  | 17.1 | 17.1 |
| PA66L | wt % | 49.4 | 49.4 | 49.2 |
| KI | wt % |  |  | 0.2 |
| KB | wt % | 3.4 | 3.4 | 3.4 |
| Total | wt % | 100.0 | 100.0 | 100.0 |
| Presence of a carbon type filler for an electrically conductive use |  | yes | yes | yes |
| Volume inherent resistance-1 | Ω · cm | $10^{5-6}$ | $10^{5-6}$ | $10^{5-6}$ |
| Fluidity (MFR) 280° C., 5 kg load | g/10 min | 36 | 40 | 39 |
| Coefficient of linear expansion 23° C.–70° C. | $\times 10^{-5\circ}$ C.$^{-1}$ | 8.5 | 7.5 | 7.6 |
| Izod impact strength 23° C. | J/m | 158 | 180 | 175 |
| Amount of fines generated | wt % | 0.1 or less | 0.1 or less | 0.13 |
| Adhesion property with coats | number/100 | — | 53 | 100 |

It has been proved that by changing an impact modifier from an ABA type to an ABAB type, a balance of a coefficient of linear expansion and an impact resistance is further greatly improved, and by adding KI, an adhesion property with coats also is enormously improved.

Industrial Applicability

The resin composition of the present invention is a resin composition which has excellent electrical conductivity, fluidity, and an excellent balance of a coefficient of linear expansion and an impact resistance, and wherein generation of fines caused by pelletizing can be largely suppressed when processing of extrusion thereof is conducted.

What is claimed is:

1. A method for producing an electrically conducive resin composition, comprising:

using a twin screw extruder having a feed opening at an upstream and at least one feed opening at a downstream;

feeding polyamide 66 and a carbon filler for an electrically conductive use from the feed opening at the upstream and the at least one feed opening at the downstream, respectively;

melt-kneading them to form a polyamide 66 master pellet; and further using the twin screw extruder;

feeding a polyphenylene ether and a compatibilizer from the feed opening at the upstream and melt-kneading them; and subsequently feeding the polyamide 66 master pellet from the at least one feed opening at the downstream and further melt-kneading them.

2. A method for producing an electrically conductive resin composition, comprising:

using a twin screw extruder having a feed opening at an upstream and at least one feed opening at a downstream;

feeding a polyphenylene ether, a compatibilizer and an impact modifier from the feed opening at the upstream and melt-kneading them; and subsequently feeding a polyamide and a polyamide 66 master pellet as well as an ethylene-a-olefin copolymer and/or a modified ethylene-a-olefin copolymer, from the at least one feed opening at the downstream and further melt-kneading them, wherein the polyamide 66 master pellet is one obtained by:

using the twin screw extruder;

feeding polyamide 66 and a carbon type filler for an electrically conductive use from the feeding opening at the upstream and the at least one feed opening at the downstream, respectively; and melt-kneading them.

* * * * *